United States Patent
Liu et al.

(10) Patent No.: US 11,700,988 B2
(45) Date of Patent: Jul. 18, 2023

(54) CLEANING METHOD OF CLEANING ROBOT, CHIP, AND CLEANING ROBOT

(71) Applicant: SHENZHEN SILVER STAR INTELLIGENT GROUP CO., LTD., Guangdong (CN)

(72) Inventors: Dunhao Liu, Shenzhen (CN); Shunfeng Jiang, Shenzhen (CN)

(73) Assignee: SHENZHEN SILVER STAR INTELLIGENT GROUP CO., LTD., Shenzhen (CN)

(*) Notice: Subject to any disclaimer, the term of this patent is extended or adjusted under 35 U.S.C. 154(b) by 370 days.

(21) Appl. No.: 17/004,337

(22) Filed: Aug. 27, 2020

(65) Prior Publication Data
US 2021/0321850 A1    Oct. 21, 2021

(30) Foreign Application Priority Data
Apr. 20, 2020 (CN) .......................... 202010313934.6

(51) Int. Cl.
*A47L 11/40* (2006.01)
*G05D 1/02* (2020.01)

(52) U.S. Cl.
CPC ....... *A47L 11/4011* (2013.01); *A47L 11/4066* (2013.01); *G05D 1/0217* (2013.01); *G05D 1/0219* (2013.01); *A47L 2201/04* (2013.01); *A47L 2201/06* (2013.01); *G05D 2201/0203* (2013.01)

(58) Field of Classification Search
CPC .............. A47L 11/4011; A47L 11/4066; A47L 2201/04; A47L 2201/06; A47L 11/4061; G05D 1/0217; G05D 1/0219; G05D 2201/0203
See application file for complete search history.

(56) References Cited

U.S. PATENT DOCUMENTS

| | | | |
|---|---|---|---|
| 8,892,251 B1 | 11/2014 | Dooley et al. | |
| 10,258,214 B2 | 4/2019 | Dooley et al. | |
| 2016/0353960 A1* | 12/2016 | Dooley | B25J 11/0085 |

FOREIGN PATENT DOCUMENTS

| | | |
|---|---|---|
| CN | 101259000 A | 9/2008 |
| CN | 103705178 A | 4/2014 |
| CN | 104757909 A | 7/2015 |
| CN | 104765362 A | 7/2015 |
| CN | 105283108 A | 1/2016 |
| CN | 110522362 A | 12/2019 |
| CN | 110786783 A | 2/2020 |

OTHER PUBLICATIONS

International Search Report dated Jan. 18, 2021, corresponding International Application No. PCT/CN2020/105622, 4 pages.

* cited by examiner

*Primary Examiner* — David Redding
(74) *Attorney, Agent, or Firm* — Maier & Maier, PLLC

(57) ABSTRACT

A cleaning method of a cleaning robot, a chip, and a cleaning robot. The cleaning method of the cleaning robot includes: moving forward and along a first lateral direction to form a first cleaning path; moving backward to form a second cleaning path; moving forward and along a second lateral direction to form a third cleaning path, where the second lateral direction is opposite to the first lateral direction; and repeatedly performing the first cleaning path, the second cleaning path, and the third cleaning path in turn. The cleaning method of the cleaning robot improves the cleaning effect by repeatedly performing a three-segment series of paths.

16 Claims, 13 Drawing Sheets

CLEANING METHOD OF CLEANING ROBOT, CHIP, AND CLEANING ROBOT

CROSS REFERENCE TO RELATED APPLICATIONS

This application claims priority to Chinese Patent Application No. 2020103139346 filed on Apr. 20, 2020, the content of which is incorporated herein by reference.

FIELD

The present disclosure relates to the field of robot technologies, and in particular to a cleaning method of a cleaning robot, a chip, and a cleaning robot.

BACKGROUND

Cleaning robots are devices that automatically clean an area to be cleaned (hereinafter referred to as a cleaning area) by sucking impurities such as dust while autonomously moving around the cleaning area without user intervention. Such cleaning robot uses a cleaning tool to repeatedly perform cleaning, while moving around the cleaning area by using two parallel wheels rotatably mounted at a bottom of a main body thereof. During execution of cleaning, the cleaning robot senses an obstacle or a wall positioned in the cleaning area via a plurality of sensors and the like, and controls cleaning actions and its moving route based on a sensing result.

Typically, the cleaning robot is designed to clean the floor by sucking dust from the floor in a dry manner. The cleaning robot that performs cleaning in the dry manner moves around the cleaning area in a zigzag or spiral pattern, thereby completing efficient cleaning in the shortest time. There is also a cleaning robot designed to clean the floor in a moist manner, such as mopping floor or washing the floor. The cleaning robot that performs cleaning in the moist manner moves around the cleaning area in the zigzag or spiral pattern, however, the effect of this cleaning method is not very satisfactory, and the cleaned floor is not very clean.

SUMMARY

The present disclosure provides a cleaning method of a cleaning robot, comprising:
the cleaning robot moving forward and along a first lateral direction to form a first cleaning path;
the cleaning robot moving backward to form a second cleaning path;
the cleaning robot moving forward and along a second lateral direction to form a third cleaning path, wherein the second lateral direction is opposite to the first lateral direction; and
the cleaning robot repeatedly performing the first cleaning path, the second cleaning path, and the third cleaning path in turn.

The present disclosure further provides a cleaning method of a cleaning robot, comprising: the cleaning robot moving forward and along a first lateral direction to form a first cleaning path;
the cleaning robot moving backward and along a second lateral direction to form a second clean path, wherein the second lateral direction is opposite to the first lateral direction;
the cleaning robot moving forward and along the first lateral direction to form a third cleaning path; and
the cleaning robot repeatedly performing the first cleaning path, the second cleaning path, and the third cleaning path in turn.

The present disclosure still provides a cleaning robot configured to clean a room, comprising:
a cleaning assembly,
a controller, configured to enable the cleaning robot to at least partially perform a cleaning method to form a cleaning track; and
a drive system, configured to drive the cleaning robot based on the cleaning track; the cleaning method, comprising:
the cleaning robot moving forward and along a first lateral direction to form a first cleaning path;
the cleaning robot moving backward to form a second cleaning path;
the cleaning robot moving forward and along a second lateral direction to form a third cleaning path, wherein the second lateral direction is opposite to the first lateral direction; and
the cleaning robot repeatedly performing the first cleaning path, the second cleaning path, and the third cleaning path in turn.

DESCRIPTION OF THE DRAWINGS

In order to illustrate the technical solutions in the embodiments of the present disclosure or in the prior art more clearly, the drawings that need to be used in the description of the embodiments or the prior art will be briefly introduced below. Obviously, the drawings in the following description are only some embodiments of the present disclosure, and other drawings may be obtained based on the structures as shown in these drawings without paying any creative effort for those of ordinary skill in the art.

Figure 1:
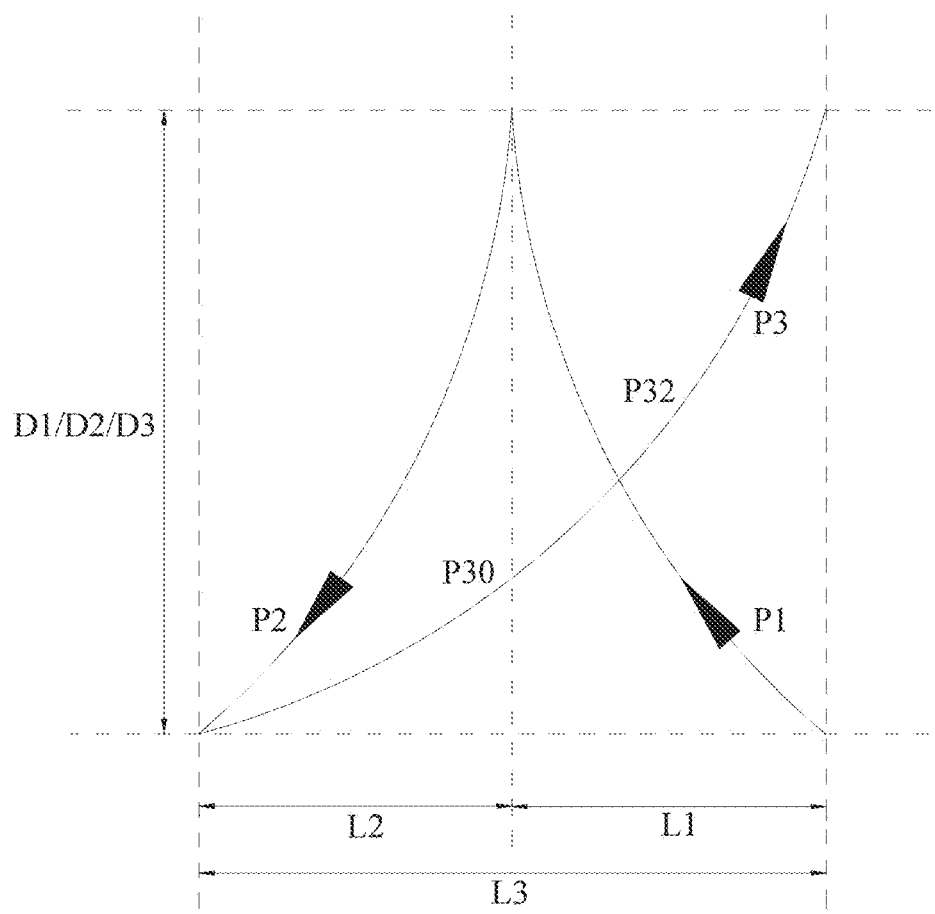
FIG. 1 is a schematic line diagram of a first embodiment of the cleaning method of the cleaning robot.

The objectives and implementations, functional characteristics and advantages of the present disclosure will be further described in conjunction with the embodiments and with reference to the accompanying drawings.

DETAILED DESCRIPTION

The technical solutions in the embodiments of the present disclosure will be clearly and completely described below in conjunction with the accompanying drawings in the embodiments of the present disclosure. Obviously, the described embodiments are only a part of the embodiments of the present disclosure, rather than all the embodiments. Based on the embodiments of the present disclosure, all other embodiments obtained by those of ordinary skill in the art without doing creative work shall fall within the protection scope of the present disclosure.

It should be noted that all directional indicators (such as up, down, left, right, front, back, . . . ) in the embodiments of the present disclosure are only used to explain relative position relationship, movement situation, etc. among components in a specific pose (as shown in the accompanying drawings). If the specific pose changes, the directional indicators will change accordingly.

In addition, in the present disclosure, descriptions such as "first", "second", etc. are only used for descriptive purposes, and cannot be understood as indicating or implying their relative importance or implicitly indicating the number of an indicated technical feature. Therefore, the feature defined with "first" or "second" may explicitly or implicitly includes at least one of the features. Moreover, the technical solutions in the various embodiments may be combined with each other, necessarily on the basis that the combination can be achieved by those of ordinary skill in the art. When there is a conflict in the combination of technical solutions or the combination cannot be achieved, it should be considered that such a combination of technical solutions does not exist and is not within the protection scope of the present disclosure.

The present disclosure provides a first embodiment of the cleaning method of the cleaning robot. Please refer to FIGS. 1 to 3, the cleaning method of the cleaning robot includes:

S1, moving forward and along a first lateral direction to form a first cleaning path P1;

S2, moving backward to form a second cleaning path P2;

S3, moving forward and along a second lateral direction to form a third cleaning path P3, here the second lateral direction is opposite to the first lateral direction;

S4, repeatedly performing the first cleaning path P1, the second cleaning path P2, and the third cleaning path P3 in turn.

In the cleaning method of this embodiment, a plurality series of paths are repeatedly performed, and a single series of paths is a three-segment path. Among them, there are two paths that have opposite directions in the forward-to-backward direction or in the lateral direction, and then the cleaning may be performed repeatedly in the front-to-rear direction or in the lateral direction. Since a cleaning assembly of the cleaning robot has a certain width, the three segment paths may be partially overlapped with each other, so that repeated cleaning for overlapped sections is realized, thereby improving the cleaning effect.

In this embodiment, the first lateral direction is to the left, and the second lateral direction is to the right. However, in other embodiments of the present disclosure, the first lateral direction is to the right, and the second lateral direction is to the left.

In this embodiment, the third cleaning path P3 includes a starting segment P30 connected to the second cleaning path P2. The starting segment P30 is located between the first cleaning path P1 and the second cleaning path P2, and a start point of the starting segment P30 is the end point of the second cleaning path P2.

Since the starting segment P30 is located between the first cleaning path P1 and the second cleaning path P2, the third cleaning path P3 may partially overlap the first cleaning path P1 and the second cleaning path P2 respectively, which increases the number and area of overlaps and in turn improves the cleanliness of a single series of paths. It should be noted that in other embodiments, the second cleaning path P2 may be formed by backing along the original path of the first cleaning path P1, but the length of the paths may be different, in this case the second cleaning path P2 completely overlaps the first cleaning path P1, and the cleaning is performed twice in the range of the second cleaning path P2.

In this embodiment, the third cleaning path P3 intersects with the first cleaning path P1, that is, the third cleaning path P3 extends to the first cleaning path P1. Moreover, the third cleaning path P3 further includes an extended segment P32 connected to the starting segment P30, and the extended segment P32 is arranged to extend beyond the first cleaning path P1. Here, an end point of the starting segment P30 is located on the first cleaning path P1, and a start point of the extended segment P32 is the end point of the starting segment P30.

Through arranging the first cleaning path P1 to intersect with the third cleaning path P3, the cross coverage area is increased, and the cleanliness of a single series of paths is further improved. It should be understood that, in other embodiments, the third cleaning path P3 may be located between the first cleaning path P1 and the second cleaning path P2 without extending beyond the first cleaning path P1 or the second cleaning path P2, and then the end point of the starting segment P30 may be on the first cleaning path P1 or the second cleaning path P2, or not on the first cleaning path P1 and the second cleaning path P2.

In this embodiment, the second cleaning path P2 is formed by moving along the first lateral direction, that is, formed by moving to the left. It should be noted that in other embodiments, the second cleaning path P2 may be formed by moving only in a backward direction, without moving in the lateral direction, that is, moving backward in a straight line.

In this embodiment, in the forward direction, the distance D1 traveled by the first cleaning path P1 is equal to the distance D2 traveled by the second cleaning path P2, and the distance D3 traveled by the third cleaning path P3 is equal to the distance D1 traveled by the first cleaning path P1, that is, $D1=D2=D3$. In the lateral direction, the distance L1 traveled by the first cleaning path P1 is equal to the distance L2 traveled by the second cleaning path P2, and the distance L3 traveled by the third cleaning path P3 is equal to twice the distance L1 traveled by the first cleaning path P1, $L1=L2=L3/2$. It should be noted that in other embodiments, $D1>D2$, $D3>D2$, $L1>L2$, and $L3>L2$, and the advancing distance and lateral distance of the first cleaning path P1, the second cleaning path P2, and the third cleaning path P3 may be determined by those skilled in the art according to actual needs, which are not limited to the above.

In this embodiment, the first cleaning path P1, the second cleaning path P2, and the third cleaning path P3 are all arc-shaped paths. However, in other embodiments, the first cleaning path P1, the second cleaning path P2, and the third cleaning path P3 may be a straight path, or a combination of a straight path and an arc-shaped path.

Please refer to FIG. 1. In this embodiment, the steps of implementing a single series of paths are as follows.

S10, move from a starting pose (x0, y0, θ0) of the first cleaning path P1 to a target pose (x1, y1, pi/2) of the first cleaning path P1, where x0, y0 of the starting pose and x1, y1 of the target pose may be an arbitrarily preset values set according to actual needs.

S20, move from a starting pose (x1, y1, pi/2) of the second cleaning path P2 (the target pose of the first cleaning path P1) to a target pose (2*x1−x0, y0, θ2) of the second cleaning path P2, where the target angle θ2 is an arbitrarily preset value set according to actual needs.

S30, move from a starting pose (2*x1−x0, y0, θ2) of the third cleaning path P3 (the target pose of the second cleaning path P2) to a target pose (x0, y1, θ3) of the third cleaning path P3, where the target angle θ3 is an arbitrarily preset value set according to actual needs.

S40, rotate the cleaning robot from the starting pose (the target pose of the third cleaning path P3) to θ0, that is, the cleaning robot will rotate to the starting angle to prepare for performing next series of paths.

Figure 2:
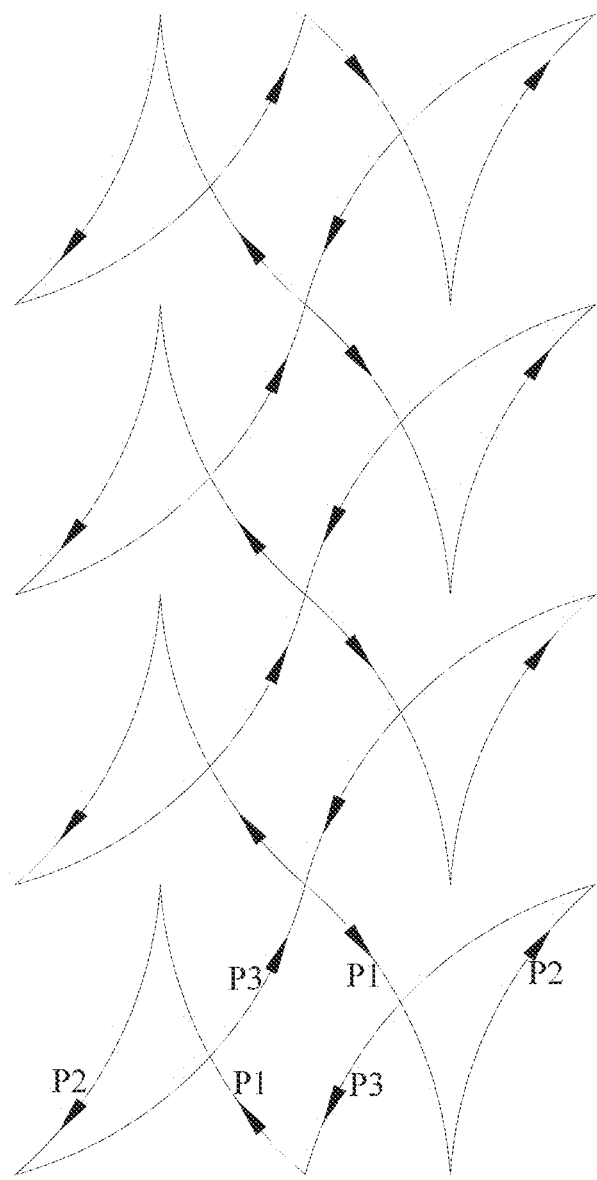
FIG. 2 is a track diagram formed by the cleaning method of the cleaning robot in FIG. 1.

Please refer to FIG. 2. In this embodiment, the steps of repeatedly performing a series of paths to achieve full coverage cleaning of the cleaning surface are as follows.

S40, rotate from the current pose of the cleaning robot to θ0.

S50, detect whether the path within the range of at least one series of paths is passable, if it is passable, perform one series of paths and continue to perform S50, otherwise perform S60.

S60, if the number of reaching a cleaning boundary is an odd number, then rotate the cleaning robot by pi+θ0, and then perform S50 until the cleaning boundary is reached again; if the number of reaching a cleaning boundary is an even number, then perform S70.

S70, the cleaning robot walks for a straight line segment, the length of the straight line segment is 4*(x1−x0), if there is no straight line segment with this length to walk, then the cleaning ends; if there is, perform S80 after walking the straight line segment.

S80, rotate the angle of the cleaning robot to θ0, and execute S50 in loop until a cleaning task of this area is completed.

Figure 3:
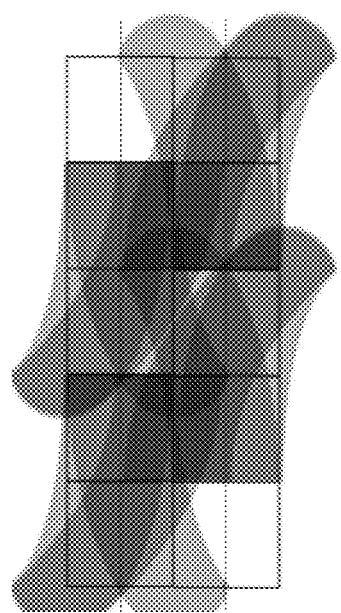
FIG. 3 is an effect diagram formed by the cleaning method of the cleaning robot in FIG. 1.

Please refer to FIG. 3, which is an effect diagram formed by the cleaning method of the cleaning robot in this embodiment. During the cleaning process of the cleaning robot, the cleaning assembly mops the ground according to the cleaning method of this embodiment to form a mopping track. Here, the cleaning assembly has an arc-shaped cleaning surface. In the figure, the area in which the floor is mopped repeatedly more times will have a denser shadow, the area in which the floor is mopped with overlaps more times will also have a denser shadow, and the area with a denser the shadow will have a better cleaning effect.

Figure 4:
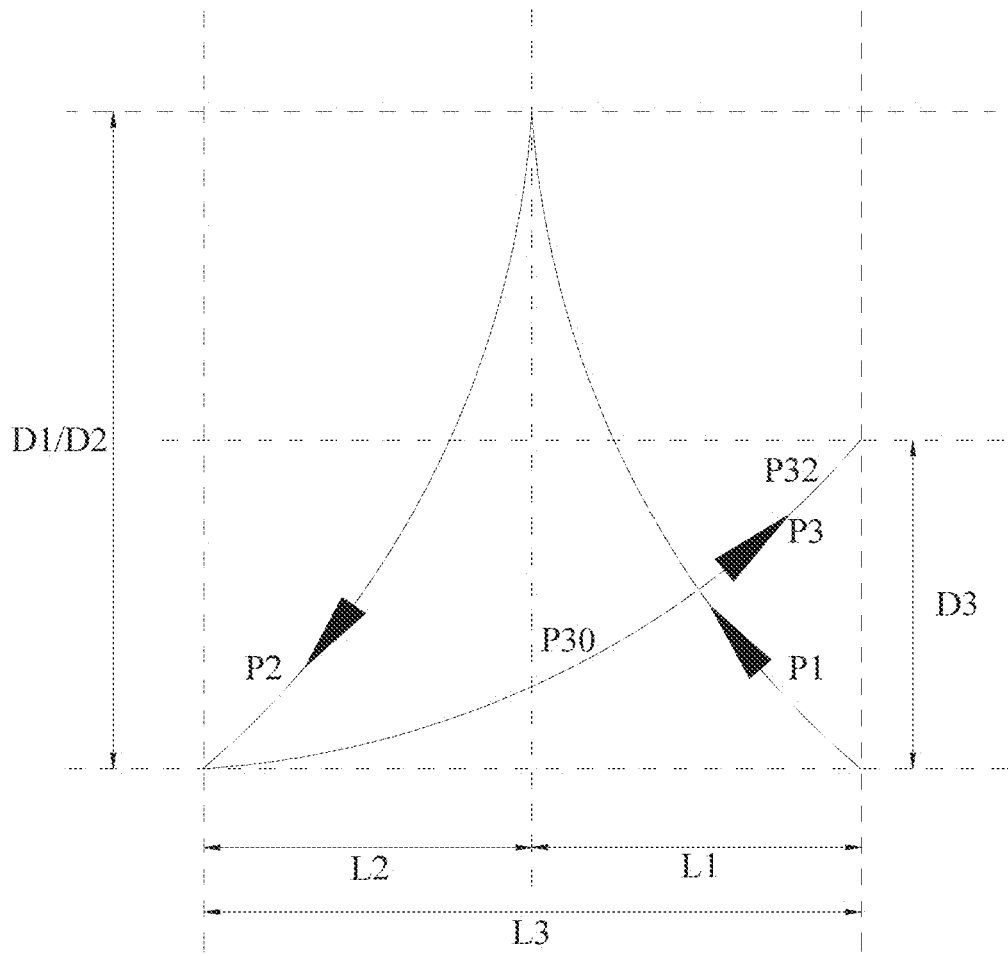
FIG. 4 is a schematic line diagram of a second embodiment of the cleaning method of the cleaning robot.

The present disclosure provides a second embodiment of the cleaning method of the cleaning robot. Please refer to FIGS. 4 to 5, there is a following difference between the cleaning method of the cleaning robot of this embodiment and the cleaning method of the above first embodiment:

in the forward direction, the distance D3 traveled by the third cleaning path P3 is half of the distance D1 traveled by the first cleaning path P1, that is, D3=D1/2. Since the advancing distance of the third cleaning path is only half of the advancing distance of the first cleaning path, then there is an overlap between adjacent two series of paths, further the overlapped area is increased and the cleaning times for the overlapped area is increased.

Figure 5:
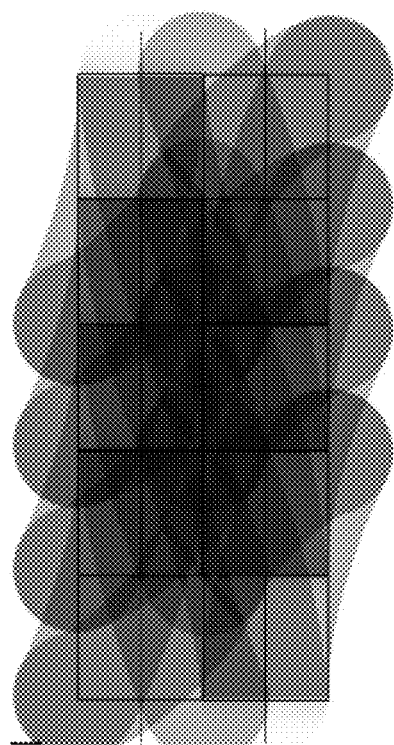
FIG. 5 is an effect diagram formed by the cleaning method of the cleaning robot in FIG. 4.

Please refer to FIG. 5, which is an effect diagram formed by the cleaning method of the cleaning robot in this embodiment. During the cleaning process of the cleaning robot, the cleaning assembly mops the ground according to the cleaning method of this embodiment to form a mopping track. Here, the cleaning assembly has a circular cleaning surface. In the figure, the area in which the floor is mopped repeatedly more times will have a denser shadow, the area in which the floor is mopped with overlaps more times will also have a denser shadow, and the area with a denser the shadow will have a better cleaning effect.

Other aspects of the cleaning method of the cleaning robot in this embodiment are basically the same as that in the first embodiment above, which shall not be repeated herein.

Figure 6:
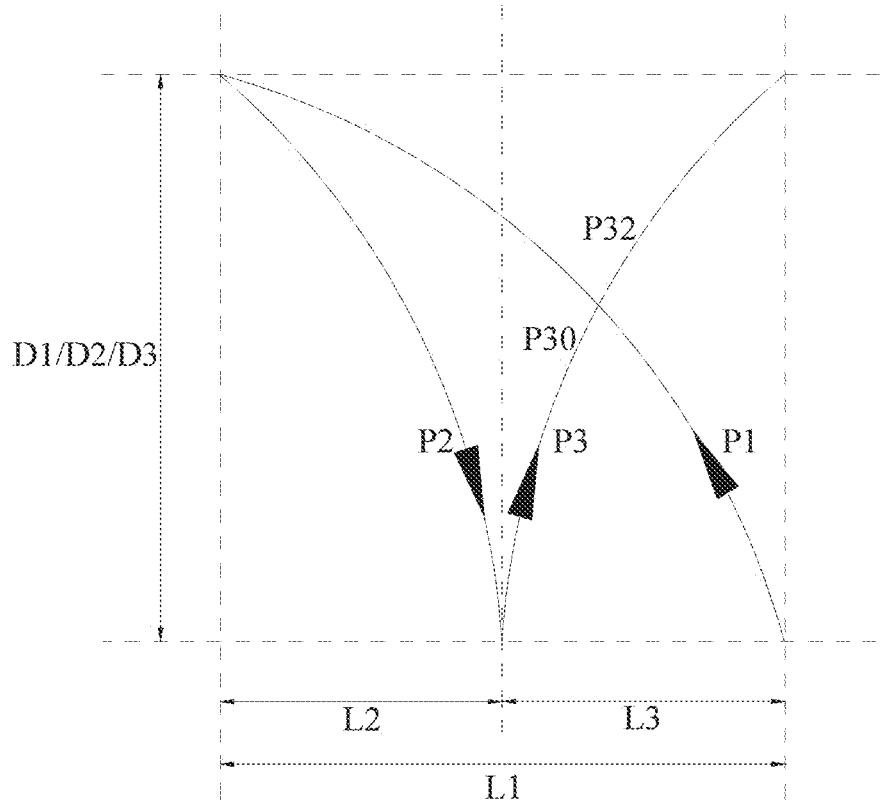
FIG. 6 is a schematic line diagram of a third embodiment of the cleaning method of the cleaning robot.
Figure 7:
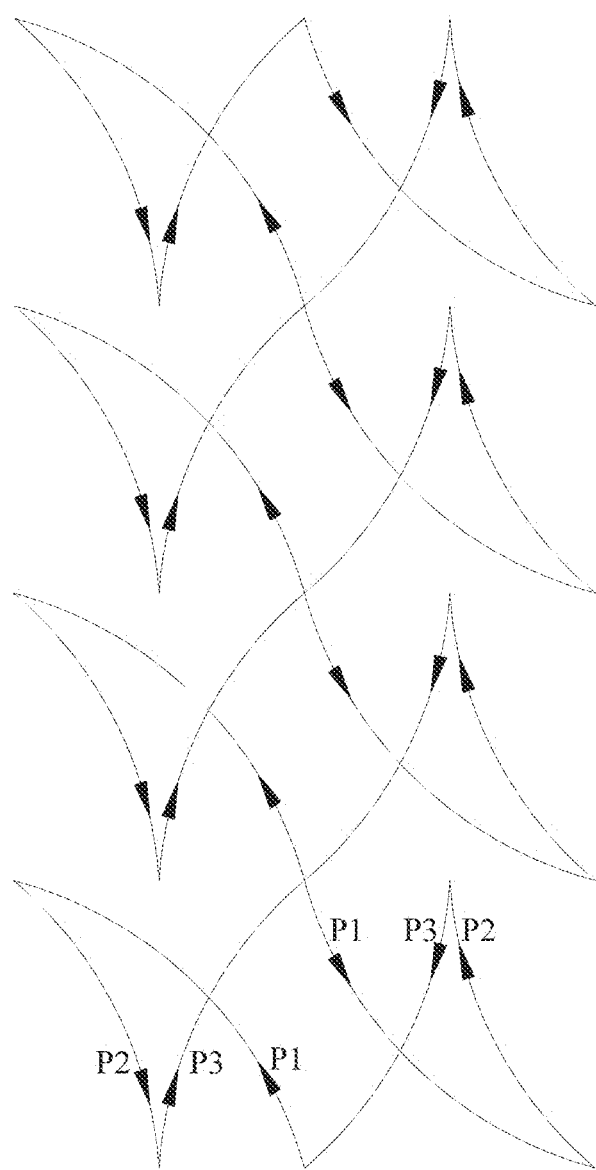
FIG. 7 is a track diagram formed by the cleaning method of the cleaning robot in FIG. 6.

The present disclosure provides a third embodiment of the cleaning method of the cleaning robot. Please refer to FIGS. 6 to 8, the cleaning method of the cleaning robot includes:

S1, moving forward and along a first lateral direction to form a first cleaning path P1;

S2, move backward and along a second lateral direction to form a second cleaning path P2, here the second lateral direction is opposite to the first lateral direction;

S3, moving forward and along the second lateral direction to form a third cleaning path P3;

S4, repeatedly perform the first cleaning path P1, the second cleaning path P2, and the third cleaning path P3 in turn.

In the cleaning method of this embodiment, a plurality series of paths are repeatedly performed, and a single series of paths is a three-segment path. Among them, the lateral moving direction of the first cleaning path P1 is opposite to that of the second cleaning path P2, such that a spaced area between the first cleaning path P1 and the second cleaning path P2 is reduced. Since the cleaning assembly of the cleaning robot has a certain width, an overlap ratio between the first cleaning path P1 and the second cleaning path P2 may be improved, and the three segment paths may be partially overlapped with each other, so as to realize repeat cleaning for the overlapped sections, thereby improving the cleaning effect.

In this embodiment, the first lateral direction is to the left, and the second lateral direction is to the right. However, in other embodiments, the first lateral direction may go right, and the second lateral direction may go left.

In this embodiment, the third cleaning path P3 includes a starting segment P30 connected to the second cleaning path P2. The starting segment P30 is located between the first cleaning path P1 and the second cleaning path P2, and a start point of the starting segment P30 is the end point of the second cleaning path P2.

Since the starting segment P30 is located between the first cleaning path P1 and the second cleaning path P2, the third cleaning path P3 may partially overlap with the first cleaning path P1 and the second cleaning path P2 respectively, which increases the number and area of overlaps and in turn improves the cleanliness of a single series of paths.

In this embodiment, the third cleaning path P3 intersects with the first cleaning path P1, that is, the third cleaning path P3 extends to the first cleaning path P1. Moreover, the third cleaning path P3 further includes an extended segment P32 connected to the starting segment P30, and the extended segment P32 is arranged to extend beyond the first cleaning path P1. Here, an end point of the starting segment P30 is located on the first cleaning path P1, and a start point of the extended segment P32 is the end point of the starting segment P30. Through arranging the first cleaning path P1 to intersect with the third cleaning path P3, the cross coverage area is increased, and the cleanliness of a single series of paths is further improved.

In this embodiment, in the forward direction, the distance D1 traveled by the first cleaning path P1 is equal to the distance D2 traveled by the second cleaning path P2, and the distance D2 traveled by the second cleaning path P2 is equal to the distance D3 traveled by the third cleaning path P3, that is, D1=D2=D3. In the lateral direction, the distance L1 traveled by the first cleaning path P1 is equal to twice the distance L2 traveled by the second cleaning path P2, and the distance L2 traveled by the second cleaning path P2 is equal to the distance L3 traveled by the third cleaning path P1, i.e., L1=2L2=2L3. It should be noted that in other embodiments, D1>D2, D3>D2, L1>L2, and L1>L3, and the advancing distance and lateral distance of the first cleaning path P1, the second cleaning path P2, and the third cleaning path P3 may be determined by those skilled in the art according to actual needs, which are not limited to the above.

In this embodiment, the first cleaning path P1, the second cleaning path P2, and the third cleaning path P3 are all arc-shaped paths.

Figure 8:
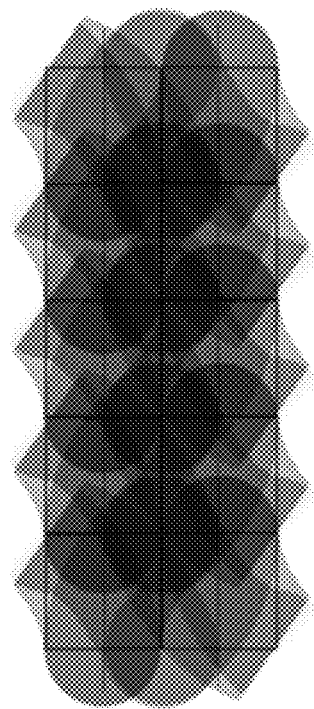
FIG. 8 is an effect diagram formed by the cleaning method of the cleaning robot in FIG. 6.

Please refer to FIG. 8, which is an effect diagram formed by the cleaning method of the cleaning robot in this embodiment. During the cleaning process of the cleaning robot, the cleaning assembly mops the ground according to the cleaning method of this embodiment to form a mopping track. Here, the cleaning assembly has a circular cleaning surface. In the figure, the area in which the floor is mopped repeatedly more times will have a denser shadow, the area in which the floor is mopped with overlaps more times will also have a denser shadow, and the area with a denser the shadow will have a better cleaning effect.

Figure 9:
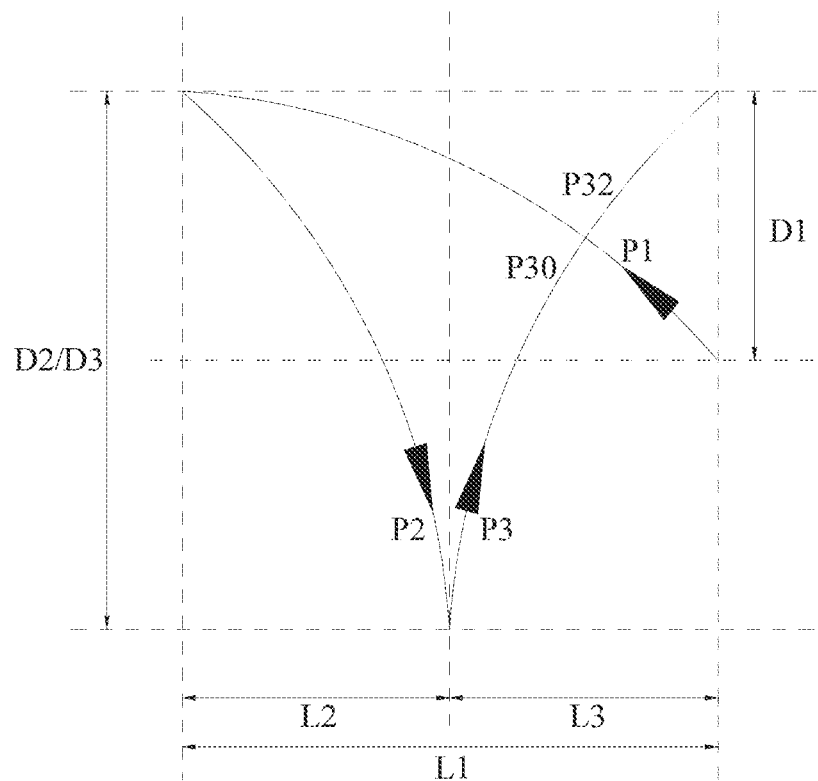
FIG. 9 is a schematic line diagram of a fourth embodiment of the cleaning method of the cleaning robot.

The present disclosure provides a fourth embodiment of the cleaning method of the cleaning robot. Please refer to FIG. 9. The cleaning method of the cleaning robot of this embodiment differs from the cleaning method of the third embodiment described above as follows.

In the forward direction, the distance D1 traveled by the first cleaning path P1 is equal to half of the distance D2 traveled by the second cleaning path P2, that is, D1=D2/2=D3/2, and then two adjacent series of paths overlap with each other, and further the overlapped area is increased and the cleaning times of the overlapped sections are improved.

The other aspects of the cleaning method of the cleaning robot in this embodiment are basically the same as the cleaning method of the third embodiment described above, and will not be repeated herein.

Figure 10:
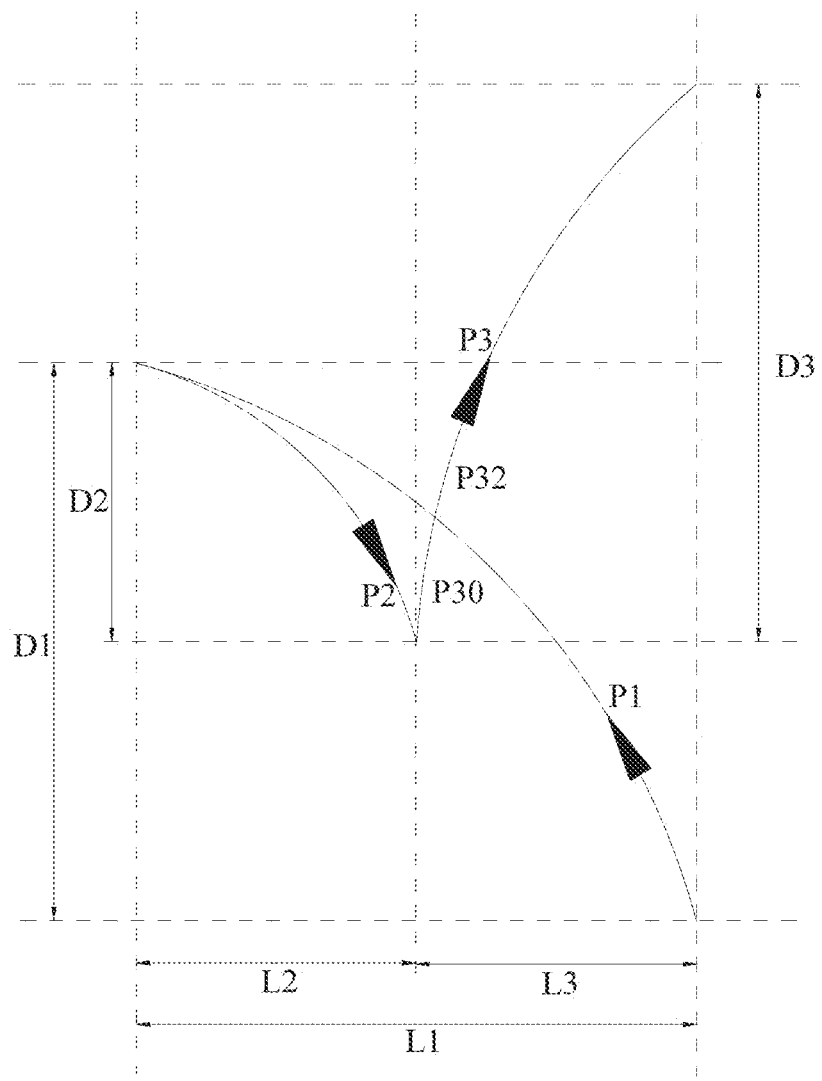
FIG. 10 is a schematic line diagram of a fifth embodiment of the cleaning method of the cleaning robot.

The present disclosure provides a fifth embodiment of the cleaning method of the cleaning robot. Please refer to FIG. 10. The cleaning method of the cleaning robot of this embodiment differs from the cleaning method of the third embodiment described above as follows.

In the forward direction, the distance D1 traveled by the first cleaning path is greater than the distance D2 traveled by the second cleaning path, and the distance D3 traveled by the third cleaning path is greater than the distance D2 traveled by the second cleaning path. The distance from the start point of the first cleaning path to the end point of the third cleaning path is H, and H=D1−D2+D3. The width of the robot body of the cleaning robot is W. If the cleaning robot is circular, the width W of the robot body is its diameter; if the cleaning robot is square, the width W of the robot body is the width of the square. Where, $0.5W \leq H \leq 1.5W$.

In the lateral method, the distance L1 traveled by the first cleaning path is greater than the distance L2 traveled by the second cleaning path, and the distance L1 traveled by the first cleaning path is greater than the distance L3 traveled by the third cleaning path. The distance L1 traveled by the first cleaning path, the distance L2 traveled by the second cleaning path, and the distance L3 traveled by the third cleaning path are all less than half the width of the robot body, that is, L1<0.5W, L2<0.5W, and L3<0.5W.

In this embodiment, by defining $0.5W \leq H \leq 1.5W$, L1<0.5W, L2<0.5W and L3<0.5W, the swing of the cleaning robot in the lateral direction may be modified, and the adjustment times for the orientation angle of the cleaning robot may be reduced, thereby improving cleaning efficiency.

In this embodiment, further D1=D3=2D2, L1=2L2=2L3, but they are not limited to this. The forward distance and lateral distance of the first cleaning path P1, the second cleaning path P2, and the third cleaning path P3 may be determined by those skilled in the art according to actual needs.

However, in other embodiments of the present disclosure, in the forward direction, the distance D1 traveled by the first cleaning path P1 is greater than the distance D2 traveled by the second cleaning path P2, and the distance D1 traveled by the first cleaning path P1 is greater than the distance D3 traveled by the third cleaning path P3, that is, D1>D2 and D1>D3. Since D1>D3, two adjacent series of paths overlap with each other, which further increases the overlapping area and improves the cleaning coverage. In the lateral direction, the distance L1 traveled by the first cleaning path P1 is greater than the distance L2 traveled by the second cleaning path P2, and the distance L1 traveled by the first cleaning path P1 is greater than the distance L3 traveled by the third cleaning path P3, that is, L1>L2, L1>L3 and so that a ratio of the forward distance to the moving distance in the lateral direction for a single series path is about 3:1, thereby controlling the cleaning width of the single series path and reducing the missed cleaning area.

The other aspects of the cleaning method of the cleaning robot in this embodiment are basically the same as the cleaning method of the third embodiment described above, and will not be repeated herein.

Figure 11:
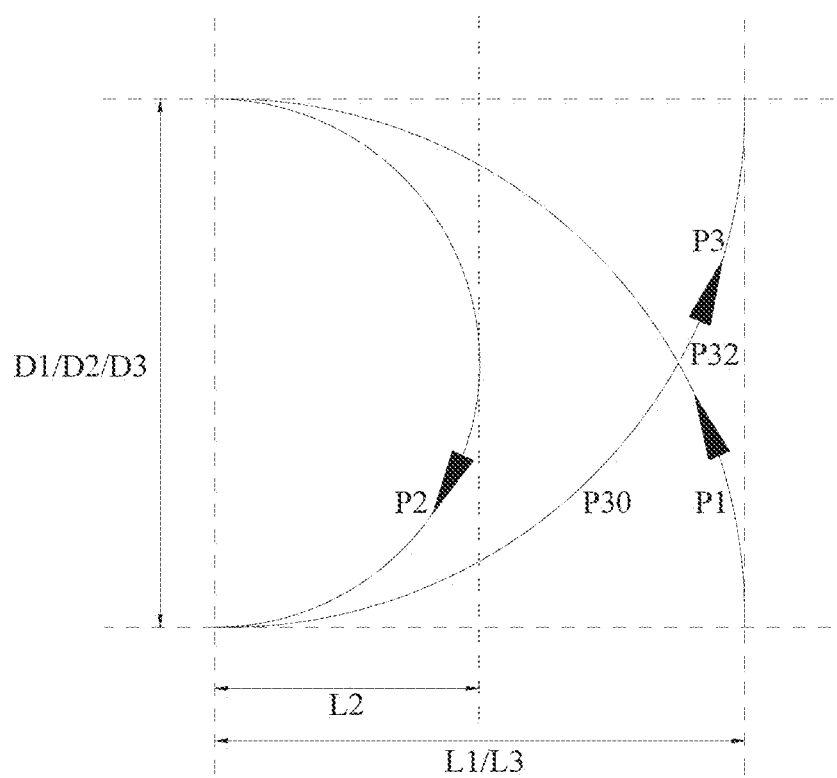
FIG. 11 is a schematic line diagram of a sixth embodiment of the cleaning method of the cleaning robot.
Figure 12:
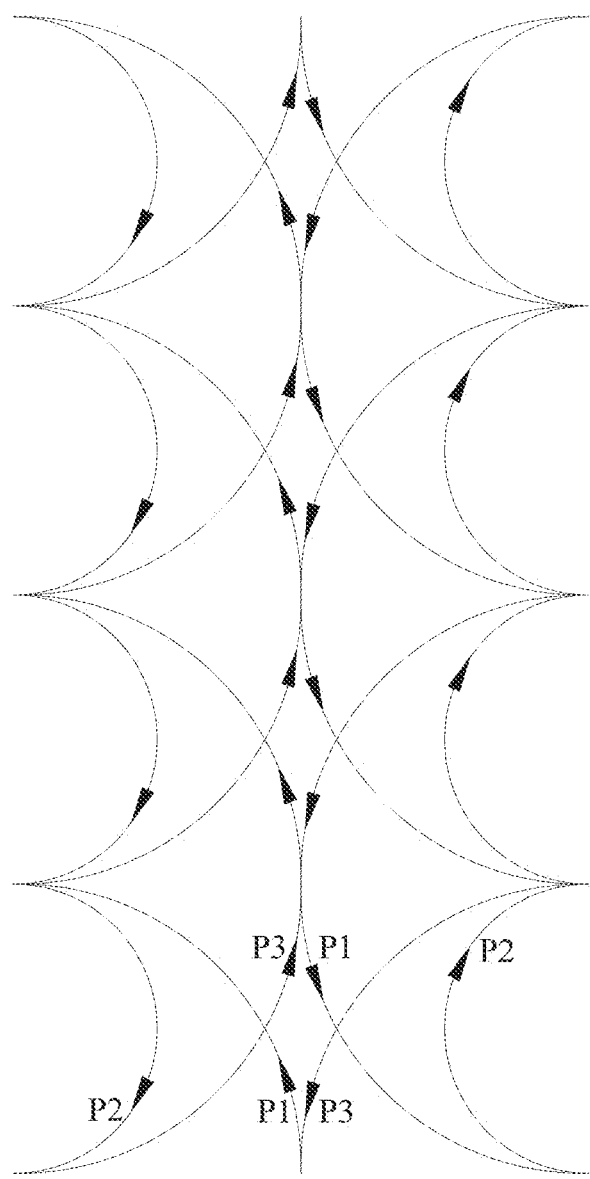
FIG. 12 is a track diagram formed by the cleaning method of the cleaning robot in FIG. 11.

The present disclosure provides a sixth embodiment of the cleaning method of the cleaning robot. Please refer to FIGS. 10 to 11. The cleaning method of the cleaning robot of this embodiment differs from the cleaning method of the third embodiment described above as follows.

In this embodiment, the second cleaning path P2 is a circular arc, and its start point and end point are both in the forward direction, that is, the second cleaning path P2 first moves to the right and then to the left.

In this embodiment, the second cleaning path P2 is further a semicircular arc, that is, the second cleaning path P2 first moves to the right to form a quarter of a circular arc path, and then moves to the left to form a quarter of a circular arc path.

In this embodiment, in the lateral direction, the distance L1 traveled by the first cleaning path P1 is equal to twice the radius of the second cleaning path P2 and equal to the distance L3 traveled by the third cleaning path P3, that is, L1=L3=3L2. Moreover, the first cleaning path P1 and the third cleaning path P3 are both arc-shaped paths.

In two adjacent series of paths, the end point of the third cleaning path P3 is connected to the start point of the first cleaning path P1 of the next series of paths, and they have the same radius, and the two paths are combined into a semicircular arc. Therefore, after the cleaning robot completes one series of paths, the robot does not need to be adjusted, and continues to travel to form the first cleaning path P1 of the next series of paths with the same radius, which improves the cleaning efficiency while improving the cleaning effect.

The other aspects of the cleaning method of the cleaning robot in this embodiment are basically the same as the cleaning method of the third embodiment described above, and will not be repeated herein.

Figure 13:
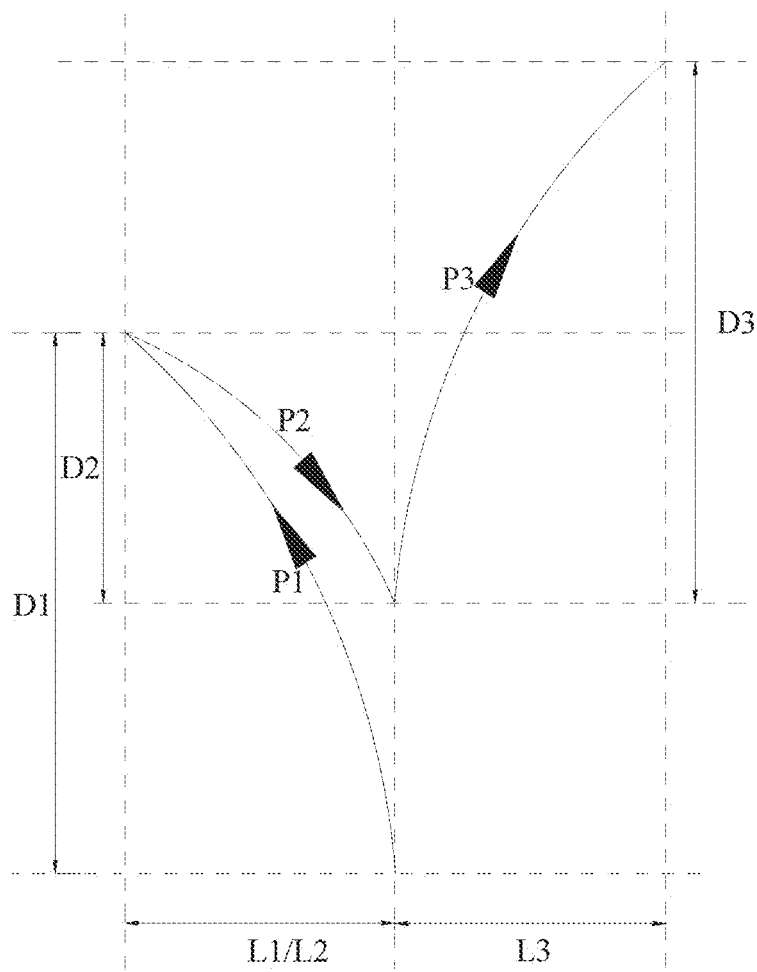
FIG. 13 is a schematic line diagram of a seventh embodiment of the cleaning method of the cleaning robot.

The present disclosure provides a seventh embodiment of the cleaning method of the cleaning robot. Please refer to FIG. 13, the cleaning method of the cleaning robot includes:

S1, moving forward and along a first lateral direction to form a first cleaning path P1; S2, moving backward and along a second lateral direction to form a second cleaning path P2, here the second lateral direction is opposite to the first lateral direction;

S3, moving forward and along the second lateral direction to form a third cleaning path P3; S4, repeatedly performing the first cleaning path P1, the second cleaning path P2, and the third cleaning path P3 in turn.

In this embodiment, the first lateral direction is to the left, and the second lateral direction is to the right. However, in other embodiments, the first lateral direction may be to the right and the second lateral direction may be to the left.

In this embodiment, the second cleaning path P2 is located on a side of the second lateral direction of the first cleaning path P1, that is, the second cleaning path P2 is located on the right side of the first cleaning path P1. Through this arrangement, the third cleaning path P3 is not between the first cleaning path P1 and the second cleaning path P2. However, in other embodiments, the second cleaning path P2 may at least partially overlap with the first cleaning path P1.

In this embodiment, in the forward direction, the distance D1 traveled by the first cleaning path is greater than the distance D2 traveled by the second cleaning path, and the distance D3 traveled by the third cleaning path is greater than the distance P2 traveled by the second cleaning path.

In this embodiment, further, D1=2D2=D3. In the lateral direction, the distance L1 traveled by the first cleaning path P1 is equal to the distance L2 traveled by the second cleaning path P2, and the distance L2 traveled by the second cleaning path P2 is equal to the distance L3 traveled by the third cleaning path P3, namely L1=L2=L3. However, they not limited to this. The forward distance and lateral distance of the first cleaning path P1, the second cleaning path P2, and the third cleaning path P3 may be determined by those skilled in the art according to actual needs.

In this embodiment, the first cleaning path P1, the second cleaning path P2, and the third cleaning path P3 are all arc-shaped paths. However, in other embodiments, the first cleaning path P1, the second cleaning path P2, and the third cleaning path P3 may all be straight paths, or a combination of straight paths and arc-shaped paths.

Figure 14:
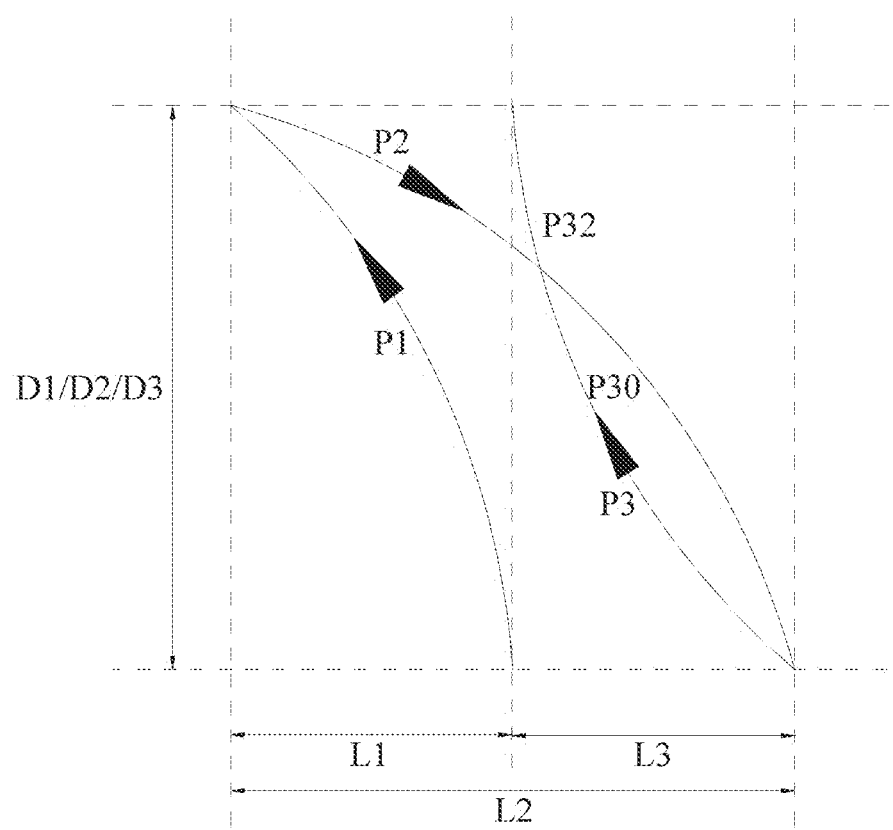
FIG. 14 is a schematic line diagram of eighth embodiment of the cleaning method of the cleaning robot.
Figure 15:
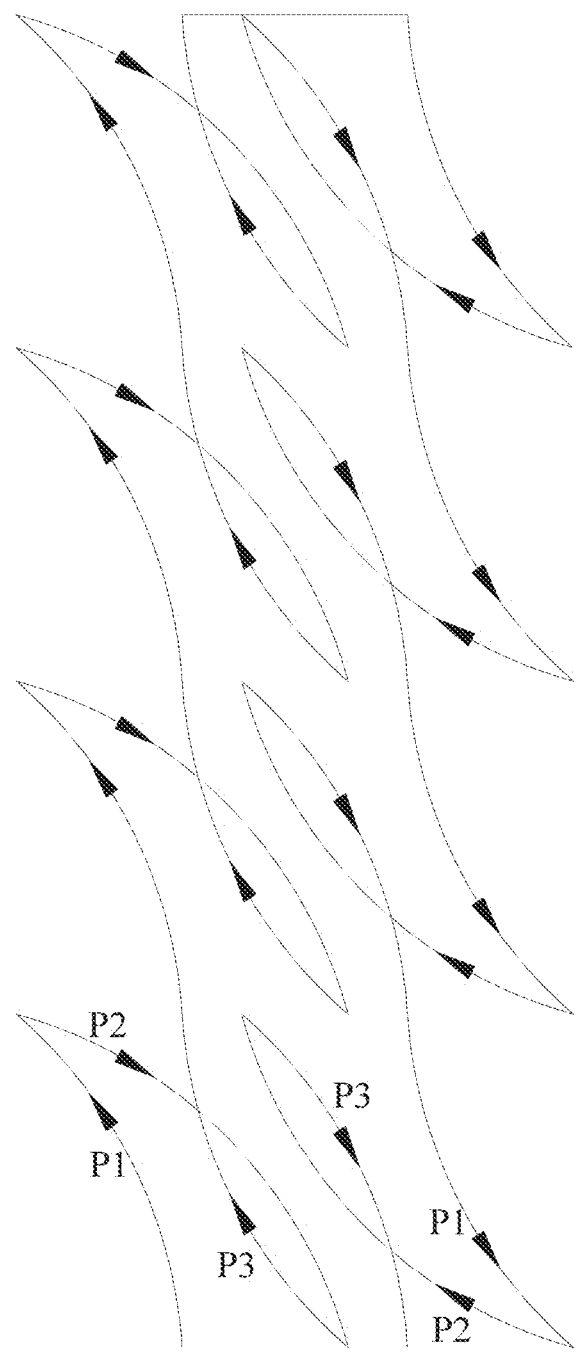
FIG. 15 is a track diagram formed by the cleaning method of the cleaning robot in FIG. 14.

The present disclosure provides an eighth embodiment of the cleaning method of the cleaning robot. Please refer to FIGS. 14 to 15, the cleaning method of the cleaning robot includes:

S1, moving forward and along a first lateral direction to form a first cleaning path P1; S2, moving backward and along a second lateral direction to form a second cleaning path P2, here the second lateral direction is opposite to the first lateral direction;

S3, moving forward and along the first lateral direction to form a third cleaning path P3; S4, repeatedly perform the first cleaning path P1, the second cleaning path P2, and the third cleaning path P3 in turn.

In the cleaning method of this embodiment, a plurality series of paths are repeatedly performed, and a single series of paths is a three-segment path. Among them, the first cleaning path P1 and the second cleaning path P2 have opposite lateral moving directions, which can reduce a spacer region between the first cleaning path P1 and the second cleaning path P2. Since a cleaning assembly of the cleaning robot has a certain width, the overlap ratio between the first cleaning path P1 and the second cleaning path P2 can be improved, and the three segment paths may be partially overlapped with each other, thereby achieving repeated cleaning for overlapped sections and improving the cleaning effect.

In this embodiment, the first lateral direction is to the left, and the second lateral direction is to the right.

In this embodiment, the third cleaning path P3 includes a starting segment P30 connected to the second cleaning path P2. The starting segment P30 is located between the first cleaning path P1 and the second cleaning path P2, and a start point of the starting segment P30 is the end point of the second cleaning path P2.

Since the starting segment P30 is located between the first cleaning path P1 and the second cleaning path P2, the first cleaning path P1 may partially overlap with the second cleaning path P2, and the third cleaning path P1 may partially overlap with the first cleaning path P1 and the second cleaning path P2 respectively, which increases the number and area of overlaps and in turn improves the cleanliness of a single series of paths.

In this embodiment, the third cleaning path P3 intersects with the second cleaning path P2 again, that is, the third cleaning path P3 intersects with the second cleaning path P2 at two positions, and the starting segment P30 of the third cleaning path P3 extends to the second cleaning path P2. Moreover, the third cleaning path P3 further includes an extended segment P32 connected to the starting segment P30, and the extended segment P32 is arranged to extend beyond the second cleaning path P2. Here, an end point of the starting segment P30 is located on the second cleaning path P2, and a start point of the extended segment P32 is the end point of the starting segment P30.

Through arranging the third cleaning path P3 to intersect with the second cleaning path P2, the cross coverage area is increased, and the cleanliness of a single series of paths is further improved.

In this embodiment, the second cleaning path P2 is formed by moving along the second lateral direction, that is, formed by moving to the right. It should be noted that in other embodiments, the second cleaning path P2 may move along the first lateral direction, i.e., move to the left; the second cleaning path P2 may also move in a backward direction, without moving in the lateral direction.

In this embodiment, in the forward direction, the distance D1 traveled by the first cleaning path P1, the distance D2 traveled by the second cleaning path P2, and the distance D3 traveled by the third cleaning path P3 are equal, that is, D1=D2=D3. In the lateral direction, the distance L1 traveled by the first cleaning path P1 is equal to half of the radius of the second cleaning path P2, and is equal to the distance L3 traveled by the third cleaning path P3, i.e., L1=L2/2=L3.

In this embodiment, the first cleaning path P1, the second cleaning path P2, and the third cleaning path P3 are all arc-shaped paths. However, in other embodiments, the first cleaning path P1, the second cleaning path P2, and the third cleaning path P3 may all be a straight path, or a combination of a straight path and an arc-shaped path.

Figure 16:
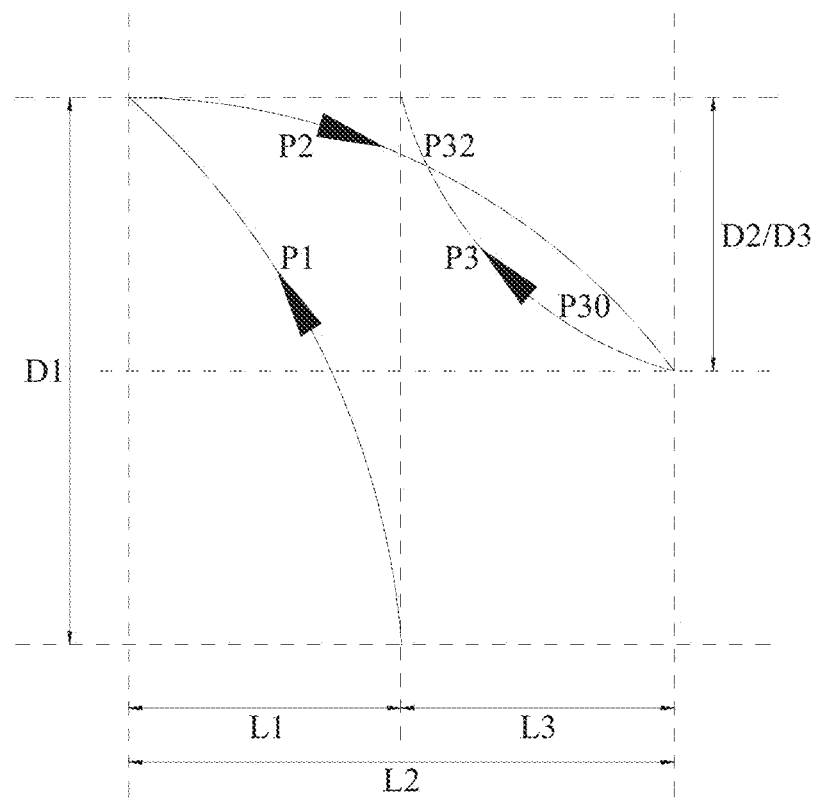
FIG. 16 is a schematic line diagram of ninth embodiment of the cleaning method of the cleaning robot.

The present disclosure provides a ninth embodiment of the cleaning method of the cleaning robot. Please refer to FIG. 16. The cleaning method of the cleaning robot of this embodiment differs from the cleaning method of the sixth embodiment described above as follows.

In the forward direction, the distance D1 traveled by the first cleaning path P1 is equal to twice the distance D2 traveled by the second cleaning path P2, and the distance D2 traveled by the second cleaning path P2 is equal to the distance D3 traveled by the third cleaning path P3, that is, D1=2D2=2D3.

Other aspects of the cleaning method of the cleaning robot in this embodiment are basically the same as the cleaning method of the above-mentioned eighth embodiment, and will not be repeated herein.

The present disclosure also provides a chip. In one embodiment, the chip is stored with a computer-executable instruction, the computer-executable instruction is used to enable the cleaning robot to execute the cleaning method of the cleaning robot in all the embodiments described above. Likely, the chip of this embodiment can also realize the technical effects of all the foregoing embodiments, which will not be repeated herein.

Figure 17:
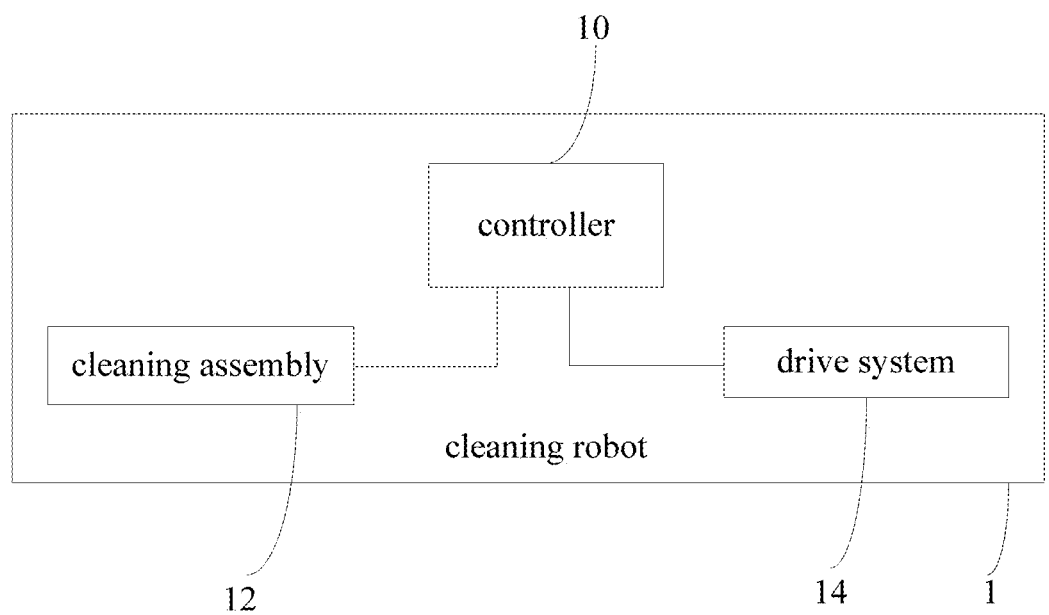
FIG. 17 is a diagram of the cleaning robot according to an embodiment of the present disclosure.

As illustrated in FIG. 17, the present disclosure also provides a cleaning robot 1. With reference to FIGS. 1 to 16, in an embodiment, the cleaning robot includes a cleaning assembly 12, a controller 10, and a drive system 14. Among them, the controller 10 is configured to cause at least part of the cleaning robot 1 to perform the cleaning method of the cleaning robot of all the embodiments as described above to form a cleaning track. The drive system 14 is configured to move the cleaning robot 1 according to the cleaning track. The cleaning robot 1 in this embodiment can also realize the technical effects of all the foregoing embodiments, which will not be repeated herein.

In this embodiment, the cleaning track includes a series of paths repeated multiple times, where each series of paths includes the first cleaning path P1, the second cleaning path P2, and the third cleaning path P3.

The above descriptions only describes preferred embodiments of the present disclosure, and do not limit the scope of the present disclosure. Under the inventive concept of the present disclosure, any equivalent structural transformation by using the contents of the description and drawings of the present disclosure or direct/indirect use in other related technical fields is included in the patent protection scope of the present disclosure.

What is claimed is:

1. A cleaning method of a cleaning robot, comprising:
the cleaning robot moving forward and along a first lateral direction to form a first cleaning path;
the cleaning robot moving backward to form a second cleaning path;
the cleaning robot moving forward and along a second lateral direction to form a third cleaning path, wherein the second lateral direction is opposite to the first lateral direction; and
the cleaning robot repeatedly performing the first cleaning path, the second cleaning path, and the third cleaning path in turn;
wherein the third cleaning path comprises a starting segment connected to the second cleaning path, and the starting segment is located between the first cleaning path and the second cleaning path;
the third cleaning path intersects with the first cleaning path;
the third cleaning path further comprises an extended segment connected to the starting segment, and the extended segment is arranged to extend beyond the first cleaning path;
wherein the second cleaning path moves along the second lateral direction;
wherein,
in a forward direction, the distance traveled by the first cleaning path is greater than the distance traveled by the second cleaning path, and the distance traveled by the third cleaning path is greater than the distance traveled by the second cleaning path, the distance from a start point of the first cleaning path to an end point of the third cleaning path is H, and a width of a robot body of the cleaning robot is W; wherein $0.5W \leq H \leq 1.5W$;
in the lateral direction, the distance traveled by the first cleaning path is greater than the distance traveled by the second cleaning path and the distance traveled by the third cleaning path.

2. The cleaning method according to claim 1, wherein, the second cleaning path moves along the first lateral direction.

3. The cleaning method according to claim 2, wherein,
in a forward direction, the distance traveled by the first cleaning path is equal to the distance traveled by the second cleaning path, and the distance traveled by the third cleaning path is equal to the distance traveled by the first cleaning path or is equal to half of the distance traveled by the first cleaning path; and
in the lateral direction, the distance traveled by the first cleaning path is equal to the distance traveled by the second cleaning path, and the distance traveled by the third cleaning path is equal to twice the distance traveled by the first cleaning path.

4. The cleaning method according to claim 1, wherein,
in a forward direction, the distance traveled by the first cleaning path is equal to the distance traveled by the second cleaning path or equal to half of the distance traveled by the second cleaning path, and the distance traveled by the second cleaning path is equal to the distance traveled by the third cleaning path; and
in the lateral direction, the distance traveled by the first cleaning path is equal to twice the distance traveled by the second cleaning path, and the distance traveled by the second cleaning path is equal to the distance traveled by the third cleaning path.

5. The cleaning method according to claim 1, wherein,
in the lateral direction, the distance traveled by the first cleaning path, the distance traveled by the second cleaning path and the distance traveled by the third cleaning path are less than half of the width of the robot body.

6. The cleaning method according to claim 1, wherein,
in a forward direction, the distance traveled by the first cleaning path is greater than the distance traveled by the second cleaning path, and the distance traveled by the first cleaning path is greater than the distance traveled by the third cleaning path; and
in the lateral direction, the distance traveled by the first cleaning path is greater than the distance traveled by the second cleaning path, and the distance traveled by the first cleaning path is greater than the distance traveled by the third cleaning path.

7. The cleaning method according to claim 1, wherein the second cleaning path is a circular arc.

8. The cleaning method according to claim 7, wherein:

in a forward direction, the distance traveled by the first cleaning path, the distance traveled by the second cleaning path and the distance traveled by the third cleaning path are equal; and in the lateral direction, the distance traveled by the first cleaning path is twice the radius of the second cleaning path and equal to the distance traveled by the third cleaning path.

9. The cleaning method according to claim 1, wherein the second cleaning path at least partially overlaps with the first cleaning path, or the second cleaning path is located on a side of a second lateral direction of the first cleaning path.

10. The cleaning method according to claim 9, wherein:
in a forward direction, the distance traveled by the first cleaning path is greater than the distance traveled by the second cleaning path, and the distance traveled by the third cleaning path is greater than the distance traveled by the second cleaning path.

11. A cleaning method of a cleaning robot, comprising:
the cleaning robot moving forward and along a first lateral direction to form a first cleaning path;
the cleaning robot moving backward and along a second lateral direction to form a second clean path, wherein the second lateral direction is opposite to the first lateral direction;
the cleaning robot moving forward and along the first lateral direction to form a third cleaning path; and
the cleaning robot repeatedly performing the first cleaning path, the second cleaning path, and the third cleaning path in turn.

12. The cleaning method according to claim 11, wherein the third cleaning path comprises a starting segment connected to the second cleaning path, and the starting segment is located between the first cleaning path and the second cleaning path.

13. The cleaning method according to claim 12, wherein, the third cleaning path intersects with the first cleaning path again; and
the third cleaning path further comprises an extended segment connected to the starting segment, and the extended segment is arranged to extend beyond the first cleaning path.

14. The cleaning method according to claim 13, wherein, in a forward direction, the distance traveled by the first cleaning path, the distance traveled by the second cleaning path, and the distance traveled by the third cleaning path are equal; alternatively, the distance traveled by the first cleaning path is equal to twice the distance traveled by the second cleaning path, and the distance traveled by the second cleaning path is equal to the distance traveled by the third cleaning path; and
in the lateral direction, the distance traveled by the first cleaning path is equal to half of the distance traveled by the second cleaning path, and equal to the distance traveled by the third cleaning path.

15. A cleaning robot configured to clean a room, comprising:
a cleaning assembly,
a controller configured to enable the cleaning robot to at least partially perform a cleaning method to form a cleaning track; and
a drive system, configured to drive the cleaning robot based on the cleaning track;
wherein the cleaning method, comprising:
the cleaning robot moving forward and along a first lateral direction to form a first cleaning path;
the cleaning robot moving backward to form a second cleaning path;
the cleaning robot moving forward and along a second lateral direction to form a third cleaning path, wherein the second lateral direction is opposite to the first lateral direction; and
the cleaning robot repeatedly performing the first cleaning path, the second cleaning path, and the third cleaning path in turn;
wherein the third cleaning path comprises a starting segment connected to the second cleaning path, and the starting segment is located between the first cleaning path and the second cleaning path;
the third cleaning path intersects with the first cleaning path;
the third cleaning path further comprises an extended segment connected to the starting segment, and the extended segment is arranged to extend beyond the first cleaning path;
wherein the second cleaning path moves along the second lateral direction;
wherein,
in a forward direction, the distance traveled by the first cleaning path is greater than the distance traveled by the second cleaning path, and the distance traveled by the third cleaning path is greater than the distance traveled by the second cleaning path, the distance from a start point of the first cleaning path to an end point of the third cleaning path is H, and a width of a robot body of the cleaning robot is W; wherein $0.5W \leq H \leq 1.5W$;
in the lateral direction, the distance traveled by the first cleaning path is greater than the distance traveled by the second cleaning path and the distance traveled by the third cleaning path.

16. The cleaning robot according to claim 15, wherein, in the lateral direction, the distance traveled by the first cleaning path, the distance traveled by the second cleaning path and the distance traveled by the third cleaning path are less than half of the width of the robot body.

* * * * *